March 20, 1928.　　　　　　　　　　　　　　　　1,663,009
W. R. JOHNSON
DECOY
Filed March 3, 1926
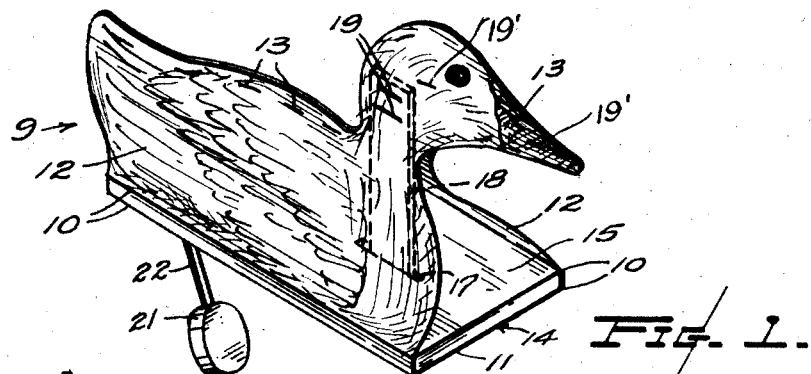
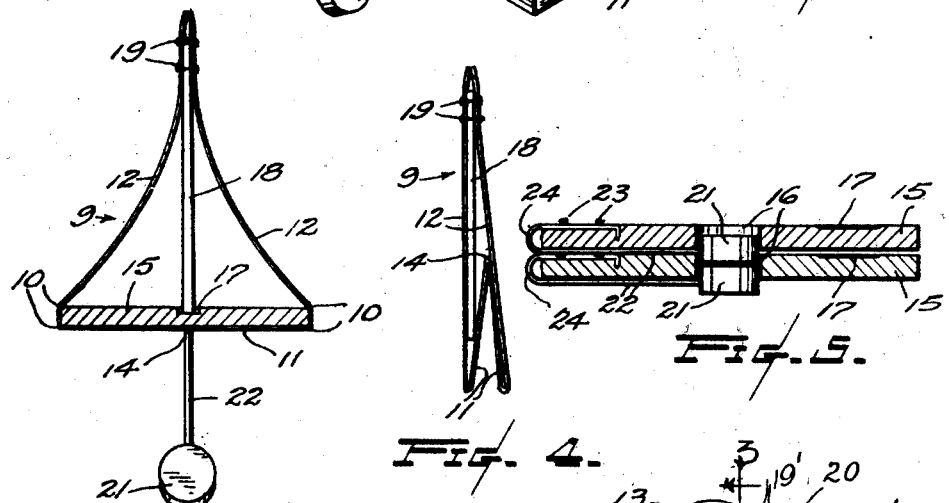
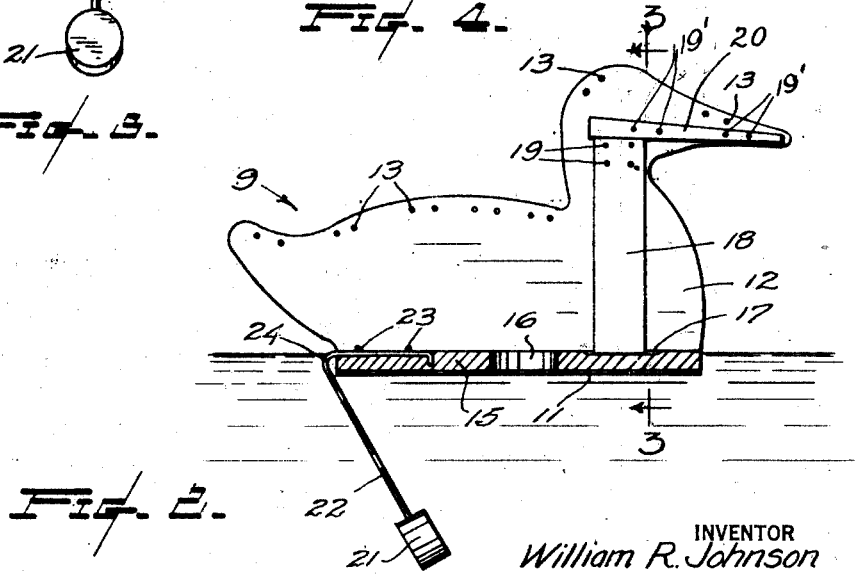
INVENTOR
William R. Johnson
BY
*Pierre James*
ATTORNEY Patented Mar. 20, 1928.

1,663,009

UNITED STATES PATENT OFFICE.

WILLIAM R. JOHNSON, OF SEATTLE, WASHINGTON.

DECOY.

Application filed March 3, 1926. Serial No. 91,953.

This invention relates to decoy ducks and, more especially, to improvements in the decoy illustrated and described in U. S. Patent No. 1,062,713 issued to me May 27, 1913.

The object of the present invention, generally stated, is to provide a more serviceable decoy than hitherto by the provision of reinforcing means to render the same more strong and rigid, and of an improved ballast device which is permanently connected to the decoy structure in a manner to enable it to be conveniently regulated for use or otherwise.

The invention consists in the novel construction, adaptation and combination of parts hereinafter described and particularly set forth in the appended claims.

In the drawing,—

Figure 1 is a perspective view of a decoy duck embodying the present invention, parts being represented by dotted lines. Fig. 2 is a longitudinal vertical section of the same illustrating the decoy floating upon water. Fig. 3 is a transverse vertical section of the decoy taken substantially on the line 3—3 of Fig. 2. Fig. 4 is a transverse sectional view of the decoy frame represented in its folded condition. Fig. 5 is a longitudinal sectional view of the float members of two decoys, with the respective stabilizing devices shown in side elevation, to illustrate the manner of assembling the same for storage and transportation purposes.

The decoy frame 9, similar to the one disclosed in the above mentioned patent, is made of a sheet of waterproofed cardboard, or other suitable material, which is formed and adapted to be folded along longitudinal lines 10 to provide a rectangular base section 11, and two side sections 12 in the similitude of a duck's body, head and tail.

The side sections 12 of the frame are fastened together in proximity of their upper edges by means of wire staples 13, or other known fastening device. The base section 11 of the frame is scored or creased longitudinally at 14, to enable the base section to be folded upwardly between the side sections 12 as illustrated in Fig. 4.

15 represents a substantially rectangular float member adapted to be inserted within said frame and upon the base section 11 thereof as shown in Figs. 1 and 3.

According to the present invention, said float member is provided centrally of its width and at about its midlength with an aperture 16 extending entirely through the member. In front of said aperture the float member is desirably provided in its upper surface with a longitudinal groove 17 to serve as a receptacle for the lower end of a post member 18 whose upper end extends between the complementary neck elements of the respective side sections 12 and is secured to the latter as by means of staples 19.

After the float 15 has been inserted within the frame, the operator grasps the base thereof in one of his hands and with his other hand pulls upwardly the head portion of the frame thereby straightening out the curvature of the side sections 12 to extend the frame vertically and permit the operator, by manipulating the head, to insert the lower end of the post 18 into engaged relation within the groove 17 of the float. The post thus engaged with the float serves to retain the upper portion of the frame under stress in a rigid form and is most firmly connected in an upright position with respect to the float.

The head and beak elements of the frame are reinforced by means of a strengthening piece 20 of wood, or other suitable material, disposed substantially horizontally, as shown in Fig. 2, above the post 18 and secured to the respective side walls 12 as by means of staples $19^1$.

Included in the invention is a ballast means to stabilize the decoy and prevent the same being turned over upon its side by waves or wind. Said ballast means consists of a heavy body 21 of metal which is secured to an end of a relatively stiff wire 22 whose other end is secured by means of staples 23 upon the upper surface of the float at the rear end thereof.

The wire 22 is bent at 24 to pass about the rear end of the float and thence extends as an arm forwardly and downwardly to its connection with the body 21.

The length of said arm is such that when bent up as represented in Fig. 5, the associated body 21 will be positioned to extend into the aperture 16 of the respective float.

By thus regulating the wire 22 to position said body within, or partly within, the aperture of a float, permits a number of floats, two are shown in Fig. 5, being laid one upon another to occupy a relatively small space.

After the float is removed from a frame, the latter is collapsible, as indicated in Fig. 4, into a small space, for packing or transportation.

For use, the ballast body 21 is regulated as to its position longitudinally and vertically with respect to the decoy by suitably bending the wire 22 which supports the body. Such adjustability of the body 21 is of importance, inasmuch as it affords adjustment of the floatative trim of the decoy with respect to the plane of the water level; it permits alteration of the relative heights of the center of buoyancy with the center of gravity of the decoy as a whole which affects the stability and stiffness of the decoy when afloat in the water.

What I claim, is,—

1. A decoy comprising a foldable frame having a bottom, and side walls extending upwardly therefrom, said side walls being secured together in proximity of their upper margins, a float detachably located within the lower portion of said frame, said float having a recess in its upper surface, and a post member having its upper end secured to said side walls, the lower end of said post being adapted to engage the float within said recess.

2. In a decoy having a foldable frame comprising complementary side walls and a bottom foldable upon itself and foldably connected to the lower edges of the respective side walls, means for securing the upper margins of the side walls together, a float provided within said frame, and a post having its upper end secured to said side walls and adapted to engage said float and acting mutually with the latter to retain the decoy in operative relation with each other.

3. In a duck-decoy, a foldable frame composed of a bottom wall and side walls extending upwardly from the side edges of the bottom wall, a strengthening-piece provided within the head and bill portion of the frame, a post extending downwardly means for securing the upper portions of said side walls together and to said strengthening-piece, and a float adapted to be inserted within said frame above the bottom wall thereof, said float serving as a support for the lower end of the post.

4. In a decoy, the combination with a collapsible frame having complementary side walls secured together in proximity to their upper margins, of a float adapted to be positioned within said frame, a flexible wire secured to and depending from the rear end of the float, and a heavy body provided on the lower end of said wire whereby the relative position of said body longitudinally of the float is adjusted by flexing said wire to regulate the floatative trim of the decoy.

5. In a decoy, the combination with a hollow collapsible frame, of a float adapted to be positioned within said frame, said float being provided at about its midlength with an aperture, a wire secured at one of its ends to an end of the float and providing an arm depending from the float, and a heavy body secured to the free end of said arm, said arm being of a length to carry the body into said aperture of the float when the arm is turned upwardly against the latter.

6. In a decoy, the combination with a hollow collapsible frame having side wall members, of a float adapted to be inserted between said side walls, means permanently secured to both of said side walls and adapted to bear down upon the float in proximity to one end of the latter, and a heavy body depending from the other end of the float.

Signed at Seattle, Washington, this 31st day of December, 1925.

WILLIAM R. JOHNSON.